(12) United States Patent
Lingenhöl et al.

(10) Patent No.: US 9,616,538 B2
(45) Date of Patent: Apr. 11, 2017

(54) INTERLINKING SYSTEM FOR OVERHEAD TRANSFER DEVICES

(71) Applicant: Liebherr-Verzahntechnik GmbH, Kempten (DE)

(72) Inventors: Klaus Lingenhöl, Kempten (DE); Uwe Radigk, Leutkirch-Friesenhofen (DE); Roman Landerer, Sulzberg (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 81 days.

(21) Appl. No.: 14/469,666

(22) Filed: Aug. 27, 2014

(65) Prior Publication Data

US 2015/0132084 A1     May 14, 2015

(30) Foreign Application Priority Data

Aug. 27, 2013  (DE) .................. 10 2013 014 266

(51) Int. Cl.
| | |
|---|---|
| *B23Q 7/14* | (2006.01) |
| *B23Q 41/02* | (2006.01) |
| *B65G 37/02* | (2006.01) |
| *B25J 11/00* | (2006.01) |
| *B65G 47/90* | (2006.01) |

(52) U.S. Cl.
CPC ............ *B23Q 7/14* (2013.01); *B23Q 7/1494* (2013.01); *B23Q 41/02* (2013.01); *B25J 11/00* (2013.01); *B65G 37/02* (2013.01); *B65G 47/90* (2013.01); *B65G 47/907* (2013.01)

(58) Field of Classification Search
CPC ...... B23Q 41/02; B65G 37/02; B65G 47/907; B23C 1/002; B25J 9/1615; B66C 5/04

USPC ....... 414/222.13, 749.1–749.5, 751.1, 752.1, 414/753.1

See application file for complete search history.

(56) References Cited

U.S. PATENT DOCUMENTS

| | | | | |
|---|---|---|---|---|
| 4,816,116 | A * | 3/1989 | Davis ................ | H01L 21/67201 204/298.35 |
| 8,114,001 | B2 * | 2/2012 | Horn ................... | B23Q 7/04 29/563 |
| 2005/0241129 | A1 * | 11/2005 | Naumann ............ | B23Q 7/1426 29/33 P |
| 2009/0238664 | A1 * | 9/2009 | Murata ................ | B65G 37/02 414/222.02 |
| 2010/0092272 | A1 * | 4/2010 | Echelmeyer ......... | B65G 61/00 414/591 |

(Continued)

FOREIGN PATENT DOCUMENTS

| | | | | |
|---|---|---|---|---|
| DE | 102006019326 | * | 8/2007 | ........... B23Q 7/14 |
| DE | 10 2007 009 329 A1 | | 8/2008 | |
| EP | 1 125 684 B2 | | 11/2004 | |

*Primary Examiner* — Ronald Jarrett
(74) *Attorney, Agent, or Firm* — Dilworth & Barrese, LLP

(57) ABSTRACT

The invention relates to an interlinking system for overhead transfer devices having at least two portals for the transport of workpieces or of workpieces on pallets between machines and/or supply/removal devices and vice versa. Each of the portals is in this respect equipped with at least one loading unit and the two portals are equipped with a transfer module for conveying the workpieces or the workpieces on pallets between a first and a second portal which is in turn equipped with a transport device for the reception of one or more workpieces or workpiece pallets.

12 Claims, 4 Drawing Sheets

(56) References Cited

U.S. PATENT DOCUMENTS

2010/0215470 A1* 8/2010 Bao ..................... B65G 47/907
414/749.6

* cited by examiner

INTERLINKING SYSTEM FOR OVERHEAD TRANSFER DEVICES

BACKGROUND OF THE INVENTION

The invention relates to an interlinking system for overhead transfer devices having at least two portals for the transport of workpieces or of workpieces on pallets between machines and/or supply/removal devices and vice versa. Each of the portals is in this respect equipped with a loading unit and the two portals are equipped with a transfer module for conveying the workpieces or the workpieces on pallets between a first and a second portal which is in turn equipped with a transport device for taking up one or more workpieces or workpiece pallets.

In the mass production of workpieces, in particular in the mechanical machining of workpieces, they are as a rule supplied in accordance with an exactly planned production flow to machine tools for carrying out a specific production operation sequence. For this purpose, the workpieces are first channeled at a supply device into a production system and are then transported onward in a fully automated manner within this system from one machining flow to the next. Depending on the number of production operations, the workpieces are either handed over from the production system via a handing-over apparatus or are transferred via an intermediate automated process to a following production system for carrying out further machining operations at the end of the machining.

Depending on the product group with which the workpieces can be associated, certain production systems with interlinking devices such as belts, portals, palleting cells having floor rollers or similar automated devices have proven themselves in the industry. For the machining of crankshafts, engine blocks or cylinder heads, portals for linking machine tools are frequently used, with these portals usually running above the machines for the loading of the machine tools.

The individual machine tools are supplied with workpieces using these portals, with frequently a plurality of redundant machine tools being set up next to one another beneath a portal for reasons of a flexible production volume adaptation for the parallel machining of the same production flows. It is thus possible to respond flexibly to different production quantities in that individual machines are simply switched off and on with low production volumes and in that the loading unit at the portal travels over these machines without carrying out a loading. Equally, machines which were switched off for maintenance or service purposes can easily be taken out of production without the total production line therefore having to be switched off. A flexible production quantity adaptation can take place by the possibility to travel to or to travel over the transfer positions at the machines individually using production systems of this type of construction.

A number of advantages can also be seen here on the process changeover of the production system. Redundant machines can thus already be taken out of production in part and be changed over, while the current series is still finally machined on the parallel machine.

The arrangement of the machines is first selected in accordance with the machining order. Furthermore the machine set-up must, however, also be orientated on the local circumstances and construction conditions. Support columns for higher floors or for a hall ceiling, hall length or available installation areas for the production system thus influence the extent of the automation or partly limit their lengths. Due to the installation and the construction type of the machines, the extent of the upwardly disposed automation is consequently then defined even more exactly since the transfer/takeover position of the machine likewise determine the portal development.

Furthermore, even further demands are made on the automation which results from demands such as the transfer precision of the loading unit to the workpiece mount of a machine tool, permitted temperature expansion or length position of the portal carrier, length of a cable drag chain for the electrical supply of the loading unit and simpler marginal conditions. Since a plurality of charging units frequently travel simultaneously on the portal, this also has an influence on the portal length via the maximum permitted vibrations and the permitted travel speeds resulting from this or the demands on the positioning precision. All these marginal conditions additionally limit the portal length in addition to the local demands.

In practice, the portals are therefore split into sections between which the workpieces are conveyed from one portal to the next by a further automation, frequently a floor automation. This automation can comprise a plurality of possible transport devices such as bands, shuttles, accumulating roller conveyors or similar devices.

In DE 10 2007 009 329 A1, a machining line is shown having a plurality of machining machines which are connected to one another via a transport path on which a plurality of charging units can be traveled. The charging units convey the workpieces from a charging point to the individual machines in order then to place the finished workpieces down at an unloading station after the machining. This classical design of a portal device is selected with many interlinking systems having an overhead transfer device for the transport of workpieces. In this case, however, only one single portal is shown having a receptions station and an unloading station for the interlinking of machine tools.

EP 1 125 684 A1 shows a production system having a plurality of portals which are directly connected by means of stacked cells. In this arrangement, the individual workpieces always first have to be placed down in parts carriers within the stacked cell. The filled parts carriers are then restacked by a transfer device from one stacked position to the stacked position disposed next to it before they can be taken up there by the other portal. This system is above all suitable for small, light workpieces having short machining cycle times and is frequently realized in the mass production of automobile transmissions and here frequently in gear production for transmissions.

With large, heavy workpieces, the storing of individual workpieces in mesh baskets is not suitable for stacked cells. Equally, due to the frequently longer machining times for the individual parts, much fewer workpieces are within a production cell in the production so that a direct transfer of individual workpieces is required between the portals. The intermediate storing of the workpieces is here of secondary importance in its weighting to the direct parts transfer of the workpieces as an evaluation criterion in the selection of the automation.

SUMMARY OF THE INVENTION

The object of the present invention comprises providing an innovative transfer module for the transport of workpieces or of workpieces in/on pallets in which the possibility simultaneously exists of channeling workpieces or workpiece pallets into and/or out of the direct production flow or also to buffer them until they can again be channeled into the production flow. The invention is preferably used in the linking of portals in which the direct parts transfer between the portals has priority over a buffering of workpieces such as in particular occurs in the machining of large, heavy workpieces with longer machining times such as crankshafts, engine blocks or cylinder heads.

This object is achieved in accordance with the invention by the characterizing features herein.

The advantages achieved with the invention in particular comprise the fact that the functionality of the transfer device between two loading portals is expanded. A functional unit thus arises from a pure transfer between two portals in which a plurality of further additional tasks can be carried out, provided that the cycle time of the portals provides for this or that e.g. a buffering becomes necessary due to changeover work on the line or due to disturbances at individual machines.

In addition to work such as a workpiece storage in different types of buffers, lines or so-called decoupling modules, individual workpieces can be channeled in or out. A transfer to a measuring device or to a device for carrying out SPC measurement work would equally be able to be realized as different further functional units for cleaning, marking, lettering and for different activities at and around the gripper such as maintenance or repair as well as a gripper conversion or a change of components at the gripper or even a gripper change.

Depending on the following operations or on the machines for this operation flow, a screwing/unscrewing station could also be provided to screw workpieces to workpiece carriers which are then used in the subsequent machines for fixing the workpieces in the machining process.

To realize these functions, an opening is arranged in the security and drip tray in the transfer module at one or more positions at which the transport device can transfer workpieces to the charging units or can receive them from them. This opening can be closed as required by a travelable or pivotable loading hatch. The loading units are configured in this respect such that they can reach through this opening and workpieces can be transferred to or collected from a subjacent functional device beneath the transfer module. Alternatively, a functional device arranged thereunder can also lift workpieces upwardly through this opening and transfer them d to the loading units there.

Depending on the object for the loading units, they can in this respect be vertical loading axles in an I or H arrangement; pivot arms, so-called flying robots or similar unit designs would equally be suitable to take over workpieces from or to hand them over to the transport device or the subjacent functional device. The opening can be adapted accordingly in dependence on the size of the loading unit.

The loading opening can be closed by an inwardly pivotable or inwardly movable loading hatch when the transport module is not located exactly above this opening. In this respect, the loading hatch can be arranged between the lower side of the transport module and the upper side of the security and drip tray. This has the advantage that assembly or maintenance work can then be carried out without endangering the functional devices disposed thereunder without the automation located thereabove having to be taken out of operation. The loading hatch equally prevents liquids or chips which may drip or fall off the workpieces contaminating the functional device disposed thereunder when it is not being used. It can furthermore be possible to provide this/these loading hatch(es) in the transfer module to prepare a transfer region for future work. The loading hatch must also be able to be covered in this case.

The transfer module can be arranged in different alignment variants beneath the transfer regions of the portals. A setting up will preferably take place in the longitudinal direction of the portal carriers, but a setting up transversely to the portal or a mixture of both would also be possible. The layout for the portal installation can thereby be better adapted to the local conditions.

BRIEF DESCRIPTION OF THE DRAWINGS

Further advantages and features of the invention will be explained in more detail in the following with reference to the drawing. There are shown.

DESCRIPTION OF THE PREFERRED EMBODIMENTS

Figure 1:
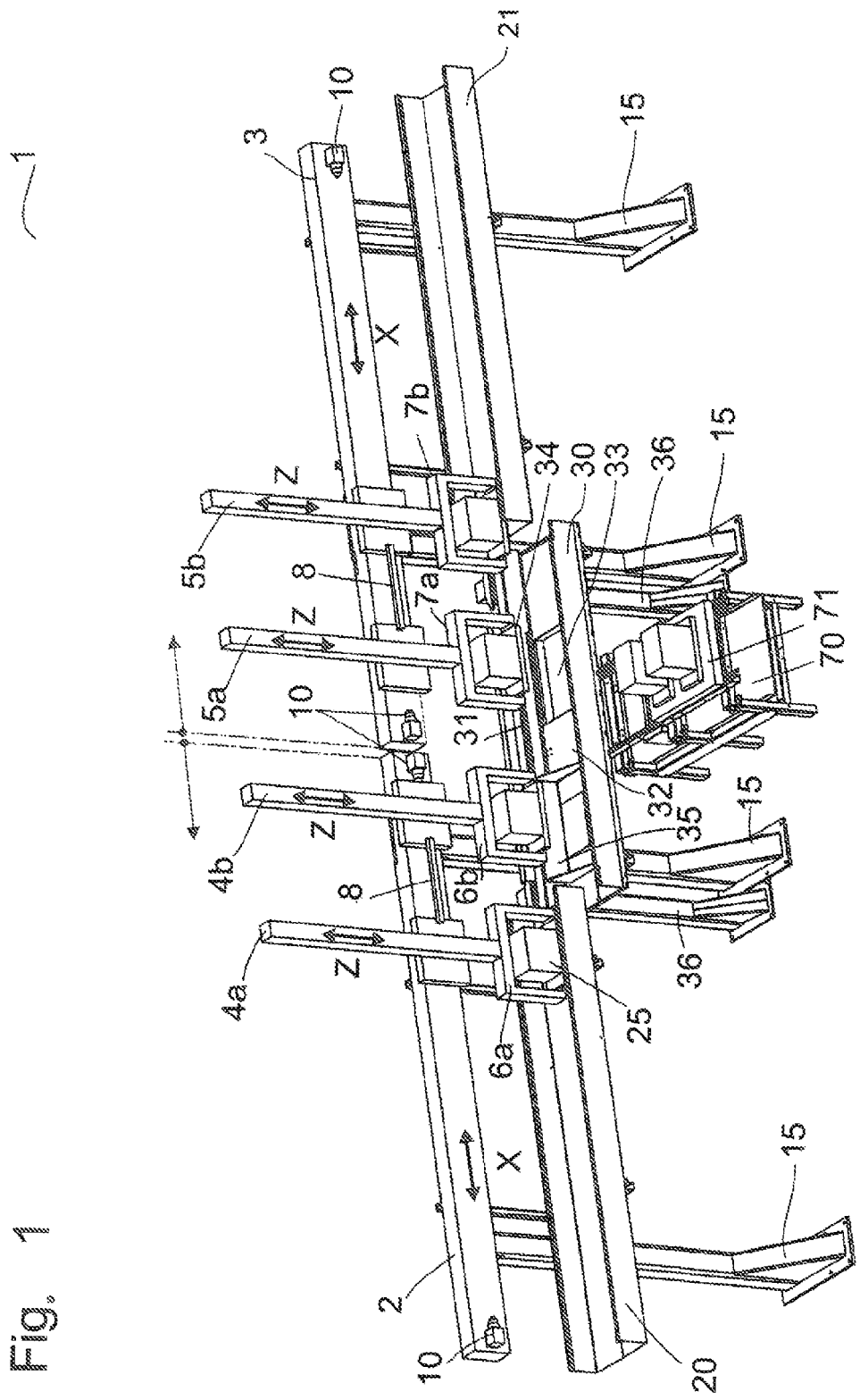
FIG. 1: an interlinking system for overhead transfer devices in accordance with the invention having a transfer module and a floor automation.

FIG. 1 shows a perspective view of an embodiment variant of the interlinking system in accordance with the invention for overhead transfer devices 1 having a transfer module 30.

The transfer module 30 in accordance with the invention is located between a first portal carrier 2 and a second portal carrier 3. A workpiece 25 can be transferred using this transfer module, optionally on a workpiece pallet 34, by a transport device 35 from the first loading unit 4*b* to the second portal loading unit 5*a* or vice versa. In the variant shown, the loading units each comprise two vertical axles (4*a*, 4*b* and 5*a*, 5*b*), with a respective two axles being connected to one another by a coupling member 8 (a so-called H arrangement) and being able to be traveled in this arrangement. Each of the vertical axles has a separately travelable Z axle with which a workpiece 25 or a workpiece on a workpiece pallet 34 can be taken over from the transfer module or from an external device by a gripper 6*a*, 6*b*, 7*a*, 7*b* or can be placed down at it again. This external device is understood in this connection as a delivery or removal device or also as a machine tool which is located in the upstream or downstream region of the loading portals.

The portal travel paths are secured in the regions in which no machines are located beneath the portals for reasons of safety and cleanliness by so-called trays 20, 21. The portal carriers 2, 3 are fastened on the portal supports 15. The transfer module 30 in this embodiment stands on separate floor supports 36 beneath the portal carriers 2 and 3 can be traveled over by the loading units. The maximum travel path of the loading units in the X direction is limited by the end abutments 10.

In the region of the transfer module 30, different functional devices can be arranged beneath it. A floor automation 70 is shown here having a workpiece pallet 71 for receiving individual workpieces 25, here mounted on workpiece pallets 34. The floor automation can be reached from the loading unit 5*a* through a loading opening 33 in the transfer module. This can be closed as required by a loading hatch 32 to provide a protected zone beneath the transfer portal in which persons can move without the transfer module having to be shut down. The lower side of the transfer module is in this respect located at a height which allows a comfortable use of the space beneath the module by persons/machine operators, with sufficient headroom also being considered.

A transport device 35 which can be traveled on a linear guide 31 between the transfer positions in the X direction takes ever the transport of individual workpieces 25 between, the loading units 4*b* and 5*a*. The transport device is positioned under program control beneath one of the transfer positions with respect to the charging unit and can there take over or hand over workpieces.

Figure 2:
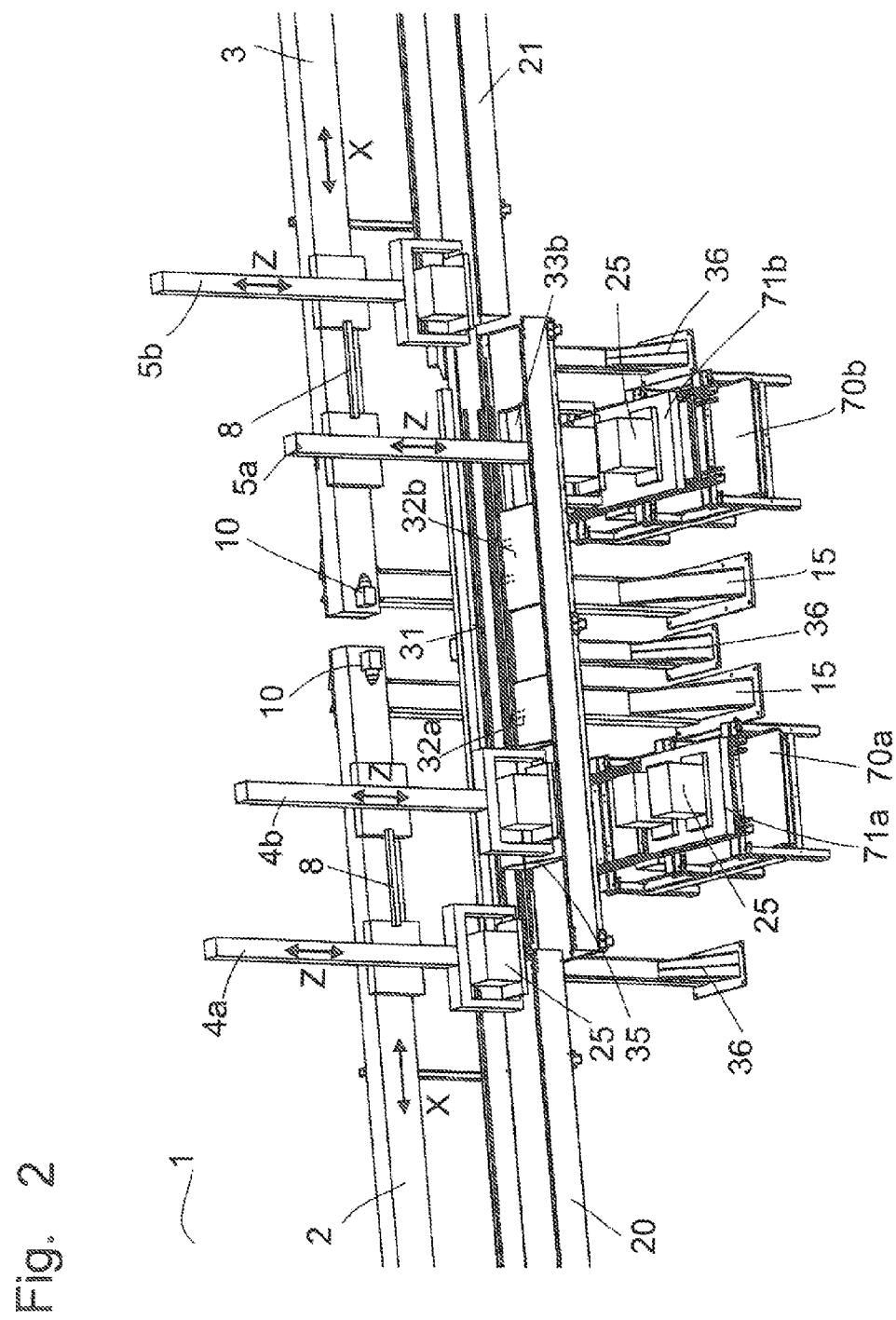
FIG. 2: an interlinking system for overhead transfer devices having an extended transfer module and two loading openings.

FIG. 2 shows an extended variant of the interlinking system having a transfer module of FIG. 1. It is possible in this variant that not only the two inner loading units 4*b* and 5*a* can access a device disposed thereunder, but all four loading units in this case. In addition, now two functional devices are arranged beneath the module. It is necessary for this purpose to extend the transfer module so that all loading units can move over the respective associated loading opening. A transfer of the workpieces between the grippers is thereby not necessary. This can otherwise be necessary in part in dependence on the devices beneath the portals and their functions. More than the two loading openings shown can naturally also be arranged in the transfer module. This inter alia depends on the space present or also on the number of functional units installed below.

Figure 3:
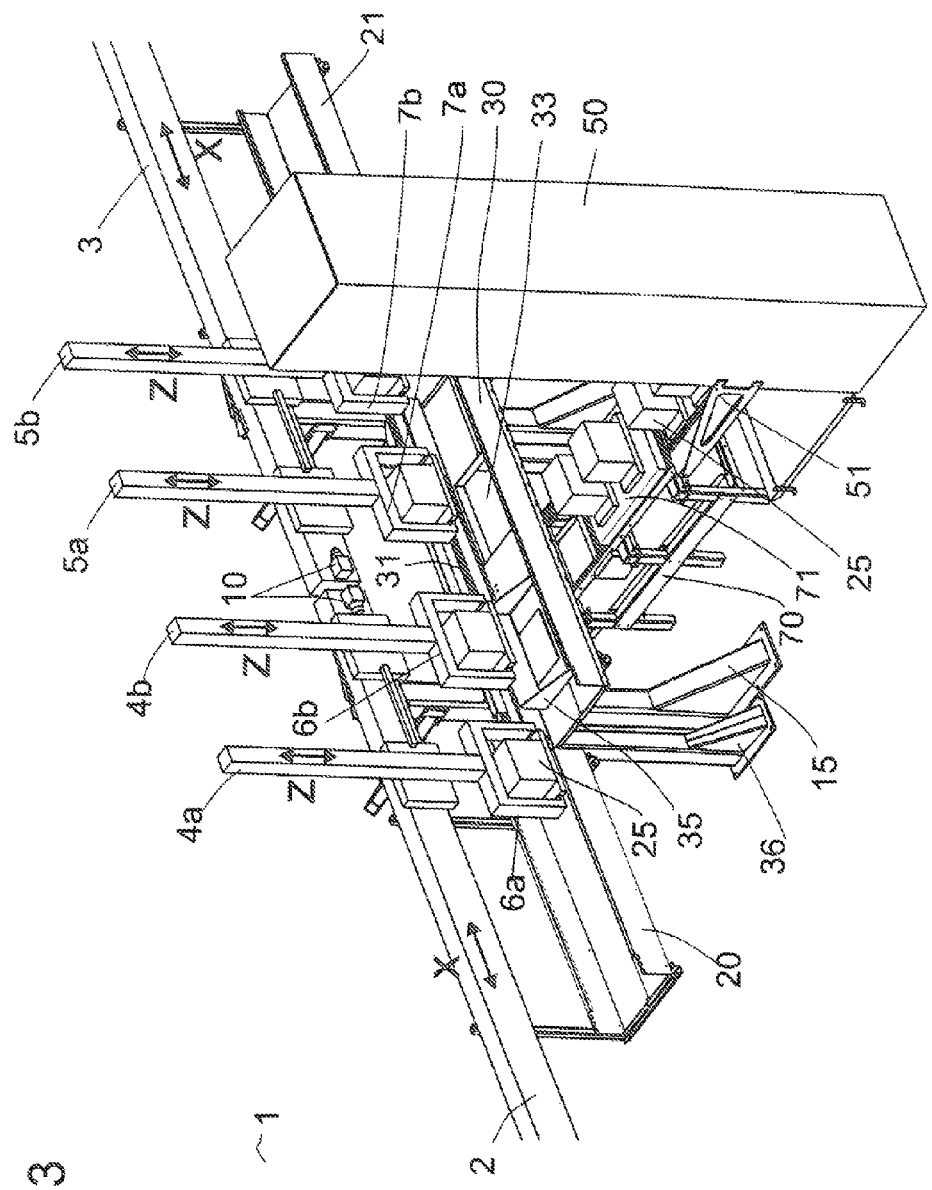
FIG. 3: an interlinking system for overhead transfer devices having a decoupling module for the buffering of workpieces.

FIG. 3 shows the transfer module 30 of FIG. 1 in conjunction with an external decoupling module 50 for the buffering of workpieces 25 supported on storage pallets 71. The storage pallets 71 can be buffered in different levels of the decoupling module 50 before the further transport via a vertical external elevator 51 attached at the decoupling module. The workpieces 25 are for this purpose placed by the loading units on the storage pallets 71. When the storage pallet is full, it is transferred by the floor automation to the elevator of the decoupling module. The elevator now conveys the pallet perpendicularly upwardly at the decoupling module and pushes the pallet into a free storage position in the storage tower. If workpieces are to be removed for the decoupling module, the process takes place in reverse order. If more storage capacity is required, a further decoupling module can be arranged behind the portals.

Figure 4:
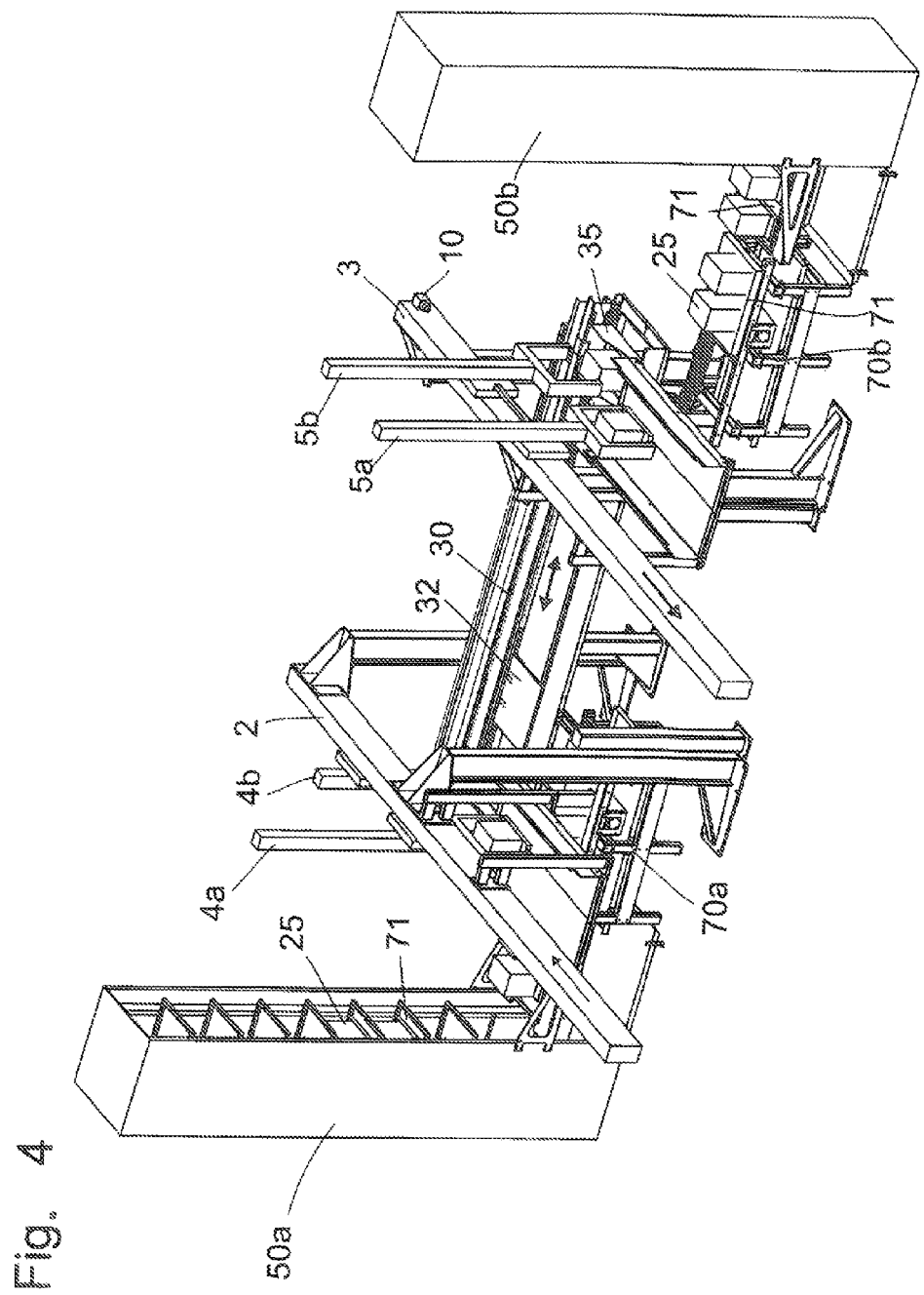
FIG. 4: an interlinking system for overhead transfer devices having a transfer module arranged transversely to the transport direction.

The variant shown in FIG. 4 shows the interlinking system having a transfer module 30 in a transverse arrangement and two decoupling modules 50 disposed beside for receiving workpieces 25 on, storage pallets 71. In the arrangement shown, the direction of material flow is rotated between a first portal carrier 2 and a second portal carrier 3. This arrangement could naturally also be selected if an offset becomes necessary between the two portal carriers 2, 3 for construction or technical layout reasons and the direction of material flow remains the same in this respect. Furthermore, a diagonal arrangement of the portal carriers 2, 3 or a branching off of a portal line is thus also possible.

The invention claimed is:

1. An interlinking system for overhead transfer devices having at least two gantries for the transport of at least one of workpieces (25) and pallets (34) on which workpieces may be located in two opposite directions, and comprising
   a horizontally-arranged carrier (2, 3) in each said gantry, said carriers (2, 3) horizontally-spaced from one another and extending along a first common axis,
   at least one loading unit (4*a*, 4*b*, 5*a*, 5*b*) per gantry, each said loading unit arranged to horizontally move back and forth on said respective gantry and composed of a pair of vertically-extending axles (4*a*, 4*b*, 5*a*, 5*b*),
   a gripper (6*a*, 6*b*, 7*a*, 7*b*) situated at an end of each said vertically-extending axle (4*a*, 4*b*, 5*a*, 5*b*) and arranged to be movable along each said respective axle (4*a*, 4*b*, 5*a*, 5*b*) in a vertical (Z) direction,
   two horizontally-extending trays (20, 21), each said horizontally extending tray (20, 21) arranged below and horizontally-offset from said respective carrier (2, 3) and underneath each said respective loading unit (4*a*, 4*b*, 5*a*, 5*b*), said horizontally-extending trays (20, 21) spaced from each other and extending along a second common axis,
   a transfer module (30) arranged for conveying the workpieces (25) or pallets (34) between the respective first and second gantries, extending between said respective first and second gantries along an axis parallel to the second common axis of said trays (20, 21) and being equipped with
   a transport device (35) arranged for receiving one or more workpieces (25) or pallets (34),
   a linear guide (31) extending between said spaced trays (20, 21) and on which the transport device (35) is mounted to move in a horizontal (X) direction between the grippers (4*a*, 5*b*), and
   at least one loading opening (33) through which one or more of said loading units (4*a*, 4*b*, 5*a*, 5*b*) are vertically downwardly (Z) extendable through the transfer module (30).

2. An interlinking system for overhead transfer devices in accordance with claim 1, wherein a storage device (70, 70*a*, 70*b*; 50; 50*a*, 50*b*) or a transfer device to a storage device, for workpieces or workpieces on pallets, is provided beneath the at least one loading opening.

3. An interlinking system for overhead transfer devices in accordance with claim 1, wherein a device for conveying, measuring, marking, cleaning, screwing or channeling in or out for individual workpieces or workpiece pallets is provided beneath the at least one loading opening.

4. An interlinking system for overhead transfer devices in accordance with claim 1, wherein a device for the gripper or a gripper finger change, is provided beneath the at least one loading opening.

5. An interlinking system for overhead transfer devices in accordance with claim 1, wherein the at least one loading opening in the transfer module can be covered as required by an inwardly pivotable or displaceable loading hatch.

6. An interlinking system for overhead transfer devices in accordance with claim 1, wherein the lower side of the transfer module is configured as a security and drip tray.

7. An interlinking system for overhead transfer devices in accordance with claim 5, wherein the inwardly pivotable or displaceable loading hatch is arranged between the transport device and a security and drip tray arranged thereunder.

8. An interlinking system for overhead transfer devices in accordance with claim 1, wherein the lower side of the transfer module is located at a height which allows access thereunder for persons or machine operators.

9. An interlinking system for overhead transfer devices in accordance with claim 1, wherein carriers for the gantries are locatable at different heights with respect to the transfer module.

10. An interlinking system for overhead transfer devices in accordance with claim 1, wherein the loading unit is a robot, an articulated robot, a vertical axle, a pivot arm or a device for the transport or for the receiving/charging of workpieces.

11. An interlinking system for overhead transfer devices in accordance with claim 1, wherein each said loading unit additionally comprises a coupling member (8) interconnecting the respective pair of axles (4a, 4b, 5a, 5b) in an H-arrangement.

12. An interlinking system for overhead transfer devices having at least two gantries for the transport of at least one of workpieces (25) and pallets (34) on which workpieces may be located in two opposite directions, and comprising a horizontally-arranged carrier (2, 3) in each said gantry, said carriers (2, 3) horizontally-spaced from one another and extending along parallel axes, at least one loading unit (4a, 4b, 5a, 5b) per gantry, each said loading unit arranged to horizontally move back and forth on said respective gantry and composed of a pair of vertically-extending axles (4a, 4b, 5a, 5b), a gripper (6a, 6b, 7a, 7b) situated at an end of each said vertically-extending axle (4a, 4b, 5a, 5b) and arranged to be movable along each said respective axle (4a, 4b, 5a, 5b) in a vertical (Z) direction, two horizontally-extending trays (20, 21), each said horizontally extending tray (20, 21) arranged below and horizontally-offset from said respective carrier (2, 3) and underneath each said respective loading unit (4a, 4b, 5a, 5b), said horizontally-extending trays (20, 21) spaced from each other and extending along parallel axes, a transfer module (30) arranged for conveying the workpieces (25) or pallets (34) between the respective first and second gantries, extending between said respective first and second gantries along an axis transverse to the axes of said carriers (2, 3) and trays (20, 21) and being equipped with a transport device (35) arranged for receiving one or more workpieces (25) or pallets (34), a linear guide (31) transversely extending between said spaced trays (20, 21) and on which the transport device (35) is mounted to move in a horizontal (X) direction between the grippers (4a, 4b, 5a, 5b), and loading openings (33) through which one or more of said loading units (4a, 4b, 5a, 5b) are vertically downwardly (Z) extendable through the transfer module (30).

* * * * *